Nov. 27, 1962 — L. P. ELBINGER — 3,066,289
MTI RADARS EMPLOYING PULSE INTERVAL MODULATION AMBIGUITY ELIMINATION
Filed Oct. 30, 1958 — 4 Sheets-Sheet 1

INVENTOR,
LEWIS P. ELBINGER.
BY Harry M. Saragovitz
ATTORNEY.

INVENTOR,
LEWIS P. ELBINGER.
BY
Harry M. Saragovitz
ATTORNEY.

3,066,289
MTI RADARS EMPLOYING PULSE INTERVAL
MODULATION AMBIGUITY ELIMINATION
Lewis P. Elbinger, Phoenix, Ariz., assignor to the United
States of America as represented by the Secretary of the
Army
Filed Oct. 30, 1958, Ser. No. 770,904
8 Claims. (Cl. 343—7.7)

This invention relates to radio object locating systems adapted to distinguish fixed objects from moving objects. These systems are commonly known as moving target indicator systems (MTI). In particular, the present invention relates to MTI systems of high pulse-repetition frequency modified to incorporate ambiguity discrimination or elimination. The method of ambiguity discrimination utilized is known as pulse interval modulation (PIM).

Both MTI and PIM systems are known separately in the art. MTI systems are shown, for example, in the patents to Dicke 2,535,274 and McConnell 2,600,255. PIM or pulse interval modulation systems are shown in the patents to Page 2,452,598 and Page 2,741,762.

As discussed in the Dicke patent, MTI radar systems may utilize transmitted pulses fixed in phase relative to the oscillations from a local oscillator in the receiver. The phase of the pulses returned from the target, relative to the local oscillations, is dependent on the distance of the target from the transmitter, and when these returning echo pulses are combined with the reference oscillations and detected, video signals are obtained which vary in amplitude in accordance with their relative phase. For fixed targets the phase is constant and therefore the amplitude of the video signals is constant, while the phase varies for moving targets, and so the amplitude of the video signals likewise varies.

In the conventional MTI radar, each transmitter pulse locks the phase of the coherent I-F oscillator, in order that the echo I-F signals from a stationary target always bear the same phase relationship to the I-F from this coherent oscillator. With this constant phase relationship established, the I-F echo beats with the C.W. reference I-F signal from the coherent I-F oscillator in the receiver, and a constant amplitude video signal is produced (assuming the amplitude of the R-F echoes remains constant). Constant amplitude video signals due to fixed targets allow removal of this fixed target video by subtracting each successive video signal from the signal of the same target which immediately precedes it. This is accomplished in the conventional MTI circuit shown in FIGURE 1, wherein the keyer 1 serves to trigger the transmitter 2, which transmits a signal through the duplexer 3 and simultaneously sends a pulse (R-F locking pulse) to mixer 4 which mixes the R-F locking pulse with a signal from the local oscillator 5 to obtain an I-F locking pulse and apply it to the coherent oscillator 6. When a signal is received, local oscillator 5 feeds into mixer 7 which mixes the incoming R-F echo with the oscillator signal to obtain an I-F echo. The echo pulses and the reference signals from coherent oscillator 6 are heterodyned together in receiver 8 and the resulting combination is detected therein to provide video pulses. The output of receiver 8 consists of two distinct types of pulses; one type, in which the pulses correspond to particular fixed objects, has pulses of substantially constant amplitude while the second type, in which the pulses correspond to moving targets, has pulses varying in amplitude due to varying phase resulting from target motion. It can be seen, then, that by the use of delay circuit 9 and subtraction circuit 10 successive pulses due to fixed targets are cancelled out and only video pulses due to moving targets will remain.

If the interval between transmitter pulses represents the maximum range of the radar set, all fixed targets within this range might be expected to be properly cancelled. However, in actual practice, even when the interval is so selected, lack of cancellation of fixed targets frequently occurs. This lack of cancellation of fixed targets results from three principal causes: (1) lack of technical perfection in the radar equipment; (2) variation in response to a target as the antenna rotates, due to the antenna pattern; (3) motion of the "fixed" targets, such as trees swaying in the wind, waves on the ocean, etc. The variation of pulse amplitude of consecutive pulses due to antenna pattern depends on the change in antenna response caused by the rotation of the antenna in the pulse repetition period. This could be decreased by slowing the antenna rotational velocity, broadening the antenna beam, or raising the pulse repetition frequency. It is evident that the first two alternatives represent a reduction in over-all performance which may be undesirable. Thus, increased pulse repetition frequency would be the ideal answer to this problem. The variation of adjacent-pulse amplitude due to motion of the fixed target can be minimized only by using a higher PRF so that the movable components of the target do not have a chance to move so far between pulses. This is the solution utilized in the instant invention.

However, if the PRF is increased in order that the R-F echo signals from fixed targets are more nearly constant, several sets of echoes will be received within the major interval of the radar system. The major interval, corresponding to the major range, represents the time required for a pulse to travel to and return from a target at the maximum usable range of the radar system. The major interval can also be defined as the maximum range time of the system. With increased PRF as used in the present invention, the intervals between pulses will now be referred to, for convenience, as sub-intervals, and the target ranges covered in these sub-intervals as sub-ranges, there being several sub-intervals in each major interval. For example, as shown in FIG. 3 and discussed in greater detail below, if the pulse-repetition frequency is increased by four times, there will be four sub-intervals and four sets of echoes returning to the receiver during each major interval.

It is important to note that the term "major interval" designates the interval between transmitter pulses before the PRF is increased, and the term "sub-interval," and designates the time between each transmitted pulse and the next succeeding one at the increased PRF.

With conventional MTI circuitry wherein the PRF is increased, coherency can exist only for the first sub-range since coherency obtained by locking the coherent I-F oscillator with each transmitter pulse can exist only for those echoes due to that transmitted pulse which return to the radar before the next transmitter pulse is transmitted. All fixed targets which lie within the major range, but beyond the first sub-range, return non-coherent echoes and therefore remain uncancelled. Thus, in high PRF radars using conventional MTI techniques, stationary targets can be eliminated only in the first sub-range. The extent to which this presents a problem depends, of course, on where the objectionable clutter (echoes due to stationary targets) is located.

When the objectionable clutter lies only in the vicinity of the radar set, the fact that distant clutter is uncancelled presents no serious problem. Such a situation is presented in the case of a ground-located, sea-search radar, where most of the clutter is due to sea-waves close to the radar set.

However, interfering clutter may exist remotely from the radar. Such a situation is presented in the case of a ground-located, air-surveillance radar. Distant mountain ranges and large storms and cloud formations create interfering screen clutter which would prevent detection and tracking of moving targets. Where such distant clutter exists, it becomes necessary to modify the conventional MTI system that is used at high PRF's. The means used in this invention is termed "delayed coherency."

In addition to distant clutter, another problem encountered as a result of the use of increased PRF is the presence of ambiguities. As stated above, when the PRF is increased, the distance to the target is such that the echo due to a given transmitter pulse does not return to the radar prior to the transmission of one or more subsequent pulses. These echoes are called higher-time-around echoes and can produce as many false-range-indicating signals on the radar indicator as there are transmitted pulses radiated between the one causing the echo, and the return of an echo from a target at maximum range. Consequently, the range display is ambiguous unless there is introduced some means for identifying which of the many range indications is the true one. One method of removing the ambiguity from the range display is by means of pulse-interval-modulation (PIM), wherein the interval between transmitted pulses is made non-uniform according to a predetermined pattern. Use of PIM with appropriate presentation of the display imparts a distinct characteristic appearance to the false-range-indicating signals which makes them readily discernible from the true-range-indicating signals. Pulse interval modulation is easily accomplished in a conventional (i.e., non-MTI) radar by means of a suitable keyer preceding the transmitter. Additional problems are encountered, however, if it is desired to employ PIM in an MTI radar. As will be more fully pointed out in the following specification, PIM cannot be applied directly to an MTI radar using increased PRF unless modifications are made in the MTI system. These modifications are the basis of the instant invention.

An object of the invention is to permit the use of high pulse repetition rates in MTI radars without the range ambiguities which normally are present as the result of returns from "second-time-around, third-time-around," and "higher-time-around" pulses.

Another object of the invention is to combine increased PRF MTI with PIM in such a manner as to secure the most efficient discrimination of unwanted signals, whether due to stationary targets or ambiguities.

The exact nature of this invention as well as other objects and advantages thereof will be readily apparent from consideration of the following specification relating to the annexed drawing in which.

Figure 1:
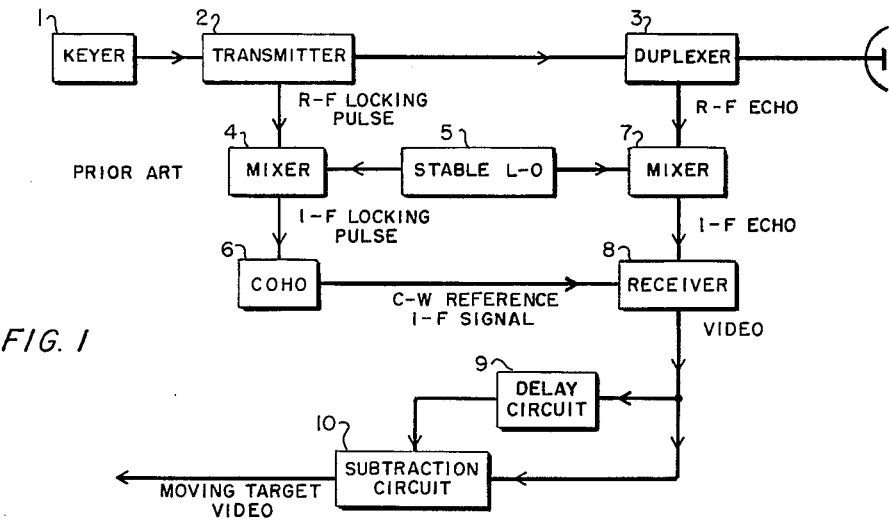
FIGURE 1 is a block diagram of an MTI circuit.
Figure 2:
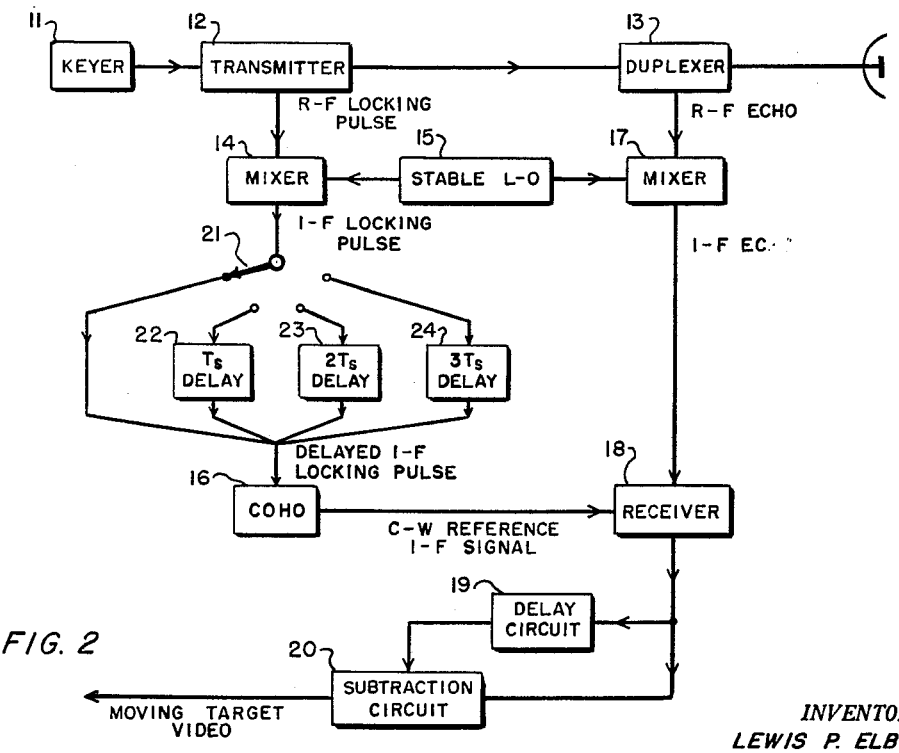
FIGURE 2 is a block diagram of a high PRF MTI utilizing delayed coherency.

In order to achieve MTI cancellation so as to remove clutter in any sub-range beyond the first it is necessary to create continuous coherency for a duration extending beyond the first sub-interval after each transmitter pluse. One method of securing this coherency is by delaying the period of coherency of the coherent I-F oscillator; this shall herein be called "delayed coherency." FIGURE 2 shows a high PRF MTI circuit utilizing delayed coherency. As can be seen from this figure, the basic circuit is the same as that of FIGURE 1, except that the I-F locking pulse itself is delayed. Thus the keyer 11, transmitter 12, duplexer 13, and the various mixers and oscillators 14–18 all function as in FIGURE 1. As can be seen, however, a clutter sub-range switch 21 is provided in FIGURE 2, and delay lines 22–24, of differing delay periods, are provided leading from the mixer 14 to coherent oscillator 16. These are fixed delay lines which could be mercury or electrical lines, or any elements having similar characteristics suitable for delaying signals. The circuit shown in FIGURE 2 is for a radar in which there are four sub-ranges for each major range. The symbol $Ts$ denotes the basic delay time, which is the length of the sub-interval, i.e., the time between successive pulses. The clutter sub-range switch 21 can be manually adjusted for the sub-range being observed. Thus, this circuit provides a means whereby clutter in a high PRF radar due to fixed targets can be eliminated in any sub-range under observation by delaying the coherent oscillator locking pulse by a suitable amount.

As stated above, in a pulse interval modulation system, the radar transmitter operates like a conventional radar transmitter except that the pulse repetition period is made non-uniform. Since modulation of the pulse repetition period can be accomplished in the triggering circuits preceding the keyer, this type of modulation is very easy to accomplish.

When the echoes from a pulse interval modulated radar are received they are applied to the vertical deflection or intensity modulation system of an oscilloscope, the linear horizontal or radial sweep of which is triggered by each transmitted pulse of the radar. Let $Tj$ be the round trip echo time for a particular fixed or slowly moving target. If $Tj$ is less than the duration of the sweep, it will appear in the same position on every sweep since $Tj$ is constant. On the other hand, if $Tj$ is somewhat longer than the sweep duration, it will appear on the next sweep (ambiguous response) in a position corresponding to $Tj-Tk,1$ where $Tk,1$ is the interval between the two adjacent transmitted pulses. Since $Tj$ is constant but $Tk,1$ is not constant when PIM is used, the position of the ambiguous response on the trace will vary from one sweep to the next. Thus the ambiguous responses appear spread out whereas the proper responses all coincide. This method of pulse interval modulation or PIM, then, enables an operator to distinguish between proper and ambiguous responses. The integration of proper echoes on the face of the scope and by the eye make them appear brighter than the ambiguous echoes which fail to integrate since they are spread out in position on the scope.

Figure 3:
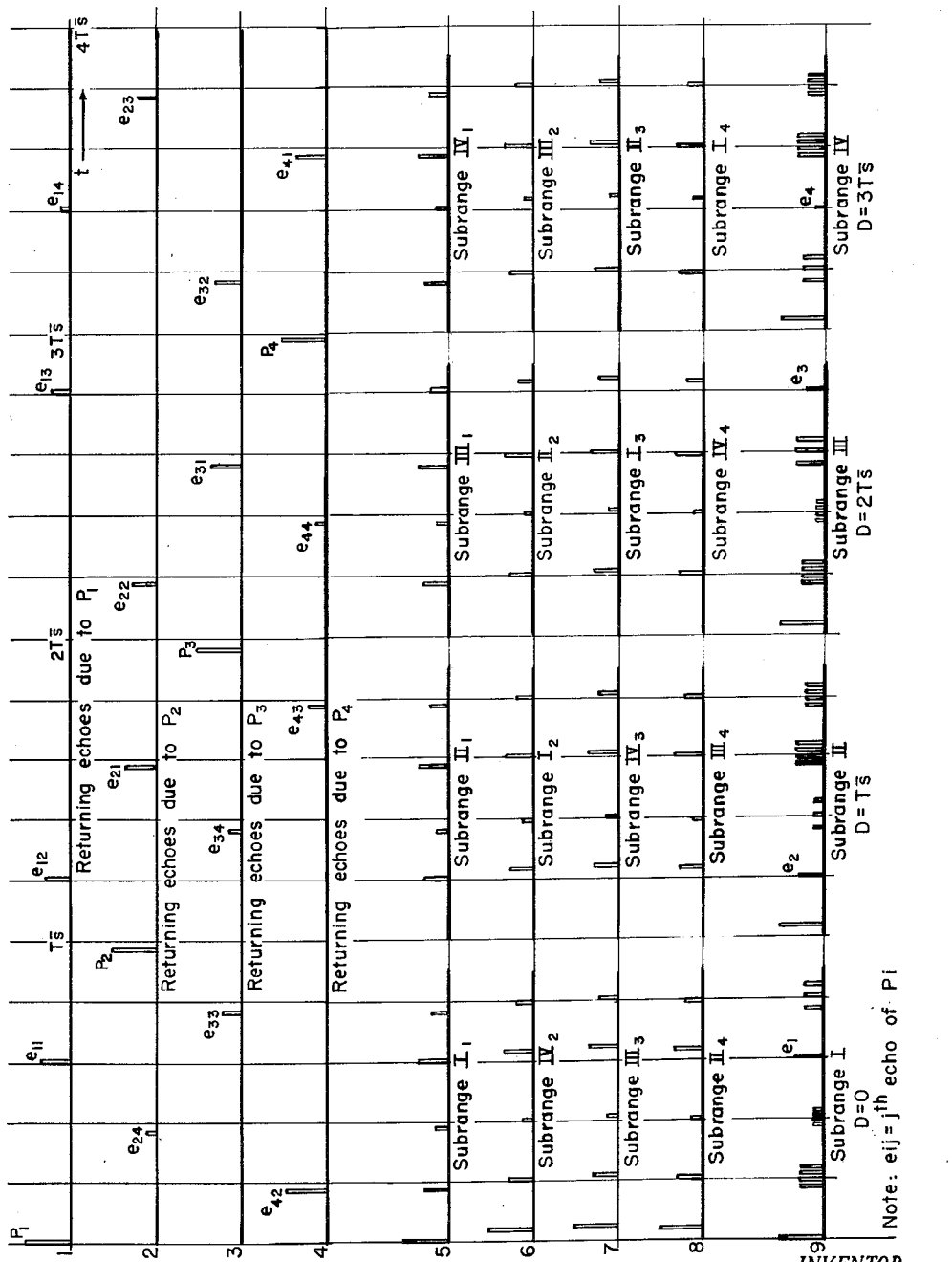
FIGURE 3 is a graphical showing of the operation of PIM as applied to MTI.

A graphical analysis of PIM as applied to a high PRF radar is shown in FIGURE 3 for four transmitted pulses and their echo pulses. Linear modulation is utilized. In this figure, the complete width of the chart ($4Ts$) represents a major interval, which is constant. The time origin, as represented by the initiation of the first pulse transmitted in the modulation cycle, is the extreme left edge.

The first line shows transmitted pulse $P_1$ and the time of return of echoes due solely to $P_1$. The second line and the succeeding lines use the same time base as the first line. The second line shows the time when $P_2$ is transmitted, the time at which its own echoes return, and also the time at which echoes return due to the counterpart of $P_2$ in the preceding cycle of modulation. The echoes shown are those returned from the same targets which return echoes for the first transmitted pulse. The third and fourth lines similarly show the time of transmission of pulses $P_3$ and $P_4$ respectively and their echoes.

As used herein the symbol $P_1$ is generic to the keying pulses that start transmitted pulses $P_1$, $P_2$, and $P_3$ and $P_4$ respectively, and the symbol $e_{ij}$ is generic to the echo pulses. The letters $i$ and $j$, associated with these symbols, are, respectively, generic to the pulse number (first, second, third or fourth pulse) and to the echo number (first, second, third, or fourth echo of a particular pulse). Accordingly, the symbol $e_{ij}$ can be considered to represent the $j$th echo of the transmitted pulse started by the $P_i$ keying pulse. For example, $e_{12}$ would be the second echo of the first transmitted pulse.

Lines 5 to 8 of the chart show the echoes returning during the duration of a sweep whose length is approximately $\overline{Ts}$ (where $\overline{Ts}$ is the duration of an average sub-interval) and which is initiated by a trigger pulse delayed by a predetermined period after a particular transmitter pulse.

The first sub-range (Subrange 1, the first sweep on line 9) appears on the indicator by initiating each sweep simultaneously with the start of each transmitter pulse and consists of superimposed Subranges $I_1$, $I_2$, $I_3$ and $I_4$ as shown on the chart of FIGURE 3 as sweep 1 on line 5, sweep 2 on line 6, sweep 3 on line 7 and sweep 4 on line 8, respectively. Echoes returning in the first average sub-interval after $P_1$ triggers the sweep are found by projecting vertically from lines 1–4 all the echoes occurring for one average sub-interval after $P_1$ occurs. This is shown in the first sweep on the fifth line (Subrange $I_1$). Subrange $I_1$ represents the first subrange after $P_1$.

Echoes, other than from $P_1$, returning in the first average sub-interval after each transmitted pulse triggers the sweep, cannot be found by projecting lines 1–4 vertically as is done for the first average sub-interval after $P_1$ is transmitted. This is due to the fact that sub-intervals between transmitted pulses are not constant in duration. Therefore, before the echo pulses can be projected vertically they must be first shifted laterally an amount to compensate for the difference between the sub-intervals. For example, as shown on the chart of FIGURE 3, the first average sub-interval (Subrange $I_2$, the second sweep of line 6) after $P_2$ starts the sweep is found by shifting to the right the echo pulses from lines 1–4, occurring for one average sub-interval after $P_2$, an amount to compensate for the difference in the sub-intervals, and then projecting vertically these echo pulses as shifted. This same procedure is followed in obtaining the first average sub-interval for transmitted pulses $P_3$ and $P_4$ after they trigger the sweep. The sweeps themselves are labeled as Subranges $I_2$, $I_3$ and $I_4$, denoting the echo pulses received due to the transmitted pulses $P_2$, $P_3$ and $P_4$, respectively, in the first sub-interval after they are transmitted. They are shown as the second, third and fourth sweeps of lines 6, 7, and 8 respectively.

Sub-range presentations other than the first are determined in a similar manner. For example, the fourth sub-range is viewed by delaying the start of each sweep by $3\overline{Ts}$ after the corresponding transmitter pulse. Thus, the sweep for this sub-range which is triggered by $P_2$ (Subrange $IV_2$ sweep 1 on line 6) starts $3\overline{Ts}$ after $P_2$ is transmitted. The second and third sub-range presentations for each transmitter pulse are similarly determined with the results being shown in lines 5 to 8.

To determine finally how the indicator presentation will appear for any sub-range, all four sweeps for a particular sub-range, as obtained from one of the lines 5 to 8, are superimposed. Thus, for instance, the third sub-range sweep 3 on line 9 consists of superimposed sweeps $III_1$, $III_2$, $III_3$, and $III_4$ as shown as the third sweep on line 5, as the fourth sweep on line 6, as the first sweep on line 7 and as the second sweep on line 8, respectively. This presentation is shown as Subrange III on line 9 of the chart. This line shows how proper echoes appear as single pulses due to superposition. These proper echoes are shown as solid vertical lines on the chart. On a scope they are intensity integrated and therefore appear brighter than the other echoes shown which are ambiguous echoes and are spread along the range axis in the sub-range being observed. Each sweep (sub-range) on line 9 represents the full scope presentation.

To summarize, then, MTI makes use of a fixed amplitude of the video signals due to fixed targets to accomplish the elimination of these signals. Desired signals (from moving targets) vary in amplitude and, as a result, successive signals cannot be cancelled. Hence, only the undesired fixed signals can be cancelled and, therefore, eliminated. PIM makes use of a varying position along the indicator axis of the ambiguous signals to effectuate the visual discrimination against these signals. Desired signals will not be spread along the indicator axis.

The presently known type of MTI using a single fixed mercury or electrical delay line presents a severe obstacle to the direct application of PIM. This MTI uses in its overall video comparison circuit a delay line which stores the signals received for one sub-interval in order that they may be compared with echoes received one sub-interval later. It is an absolute requirement of MTI using a fixed delay line that all sub-intervals be as much alike in duration as equipment permits. Any deviation from equal sub-intervals hinders exact cancellation of signals from fixed targets. In direct contrast with this MTI requirement of fixed sub-intervals, however, is the method of pulse interval modulation which relies on unequal sub-intervals. Thus a direct application of PIM to such a type of MTI is impossible.

Figure 4:
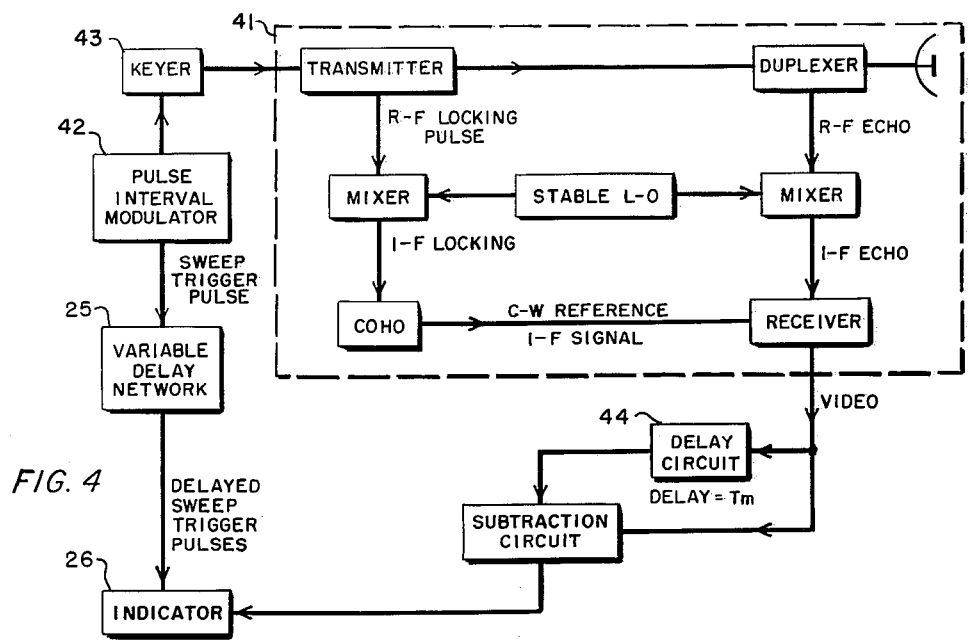
FIGURE 4 is a block diagram of a circuit incorporating PIM into an MTI circuit with a fixed delay line.

FIGURE 4 is a block diagram of a circuit incorporating PIM into an MTI circuit including a fixed delay line, in which certain modifications of the basic MTI circuit have been made in order to extract favorable features of each system, and to overcome the above-mentioned difficulty. In this figure, the elements inclosed in the dotted lines 41 are those of a conventional MTI system using a coherent I-F oscillator such as is shown in FIGURE 1. The pulse interval modulator 42 is used to give a desired interval modulation to the transmitted pulses by suitably triggering keyer 43.

The circuit of FIGURE 4 is based on the use of a delay line 44 which delays input signals for the full length of a major interval ($T_m$) of the PIM cycle. A continuous stream of comparison information results here, as in the conventional MTI. However, as stated, the comparison interval is the major interval rather than any sub-interval. A variable delay network 25 is provided for the purpose of delaying the trigger pulses which initiate the sweep of the indicator unit 26. The purpose of this delay is to permit the viewing of any portion of the major range of the radar, as discussed in connection with FIGURE 3.

Since the C.W. reference I-F signal is coherent only for echoes returning in the first sub-interval after the pulse is transmitted, the subtraction circuit will cancel only the fixed clutter in the first sub-range. All returning echoes beyond the first sub-range will remain uncancelled. Therefore, the video passing from the subtraction circuit to the indicator will be that due to all moving targets plus that due to all fixed targets beyond the first sub-range. Thus the video finally displayed on the indicator will be that of fixed and moving targets in the range being surveyed, with ambiguous echoes being discriminated against. However, if this surveyed range is the first sub-range, all ambiguities and fixed targets are eliminated.

Figure 5:
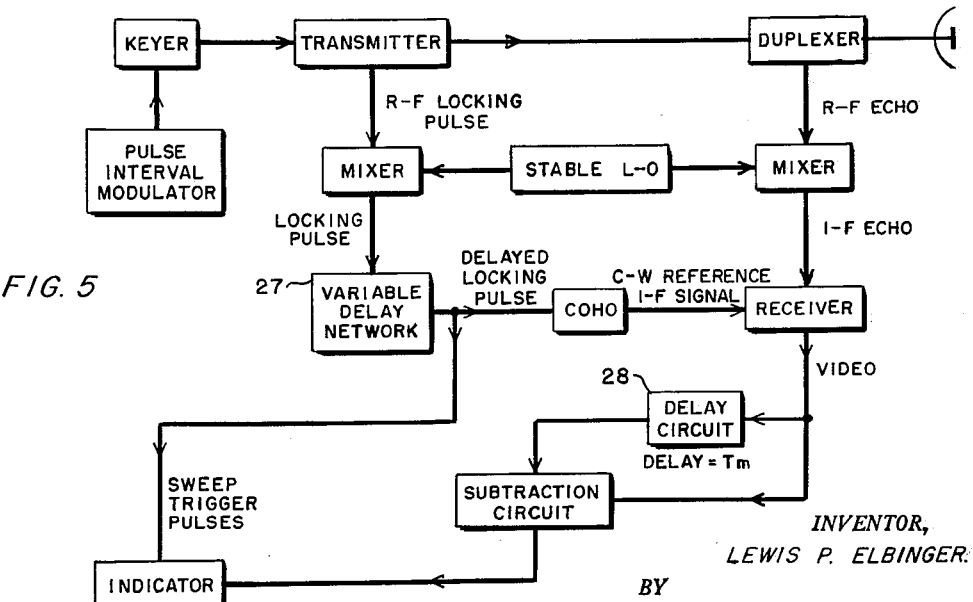
FIGURE 5 is a block diagram similar to FIGURE 4 including delayed coherency.

FIGURE 5 is a block diagram of another circuit incorporating PIM into an MTI radar with a fixed delay line. In this figure, delayed coherency is employed. The variable delay network 27 shown in the block diagram of FIGURE 5 may be of the type shown in FIGURE 2. If the amount of coherency delay is denoted by $T_d$, then echoes returning in the sub-interval $T_d$ to $(T_d + \overline{Ts})$ after the transmitted pulse are the only coherent echoes. With the delay time in delay circuit 28 being the same as that for FIGURE 4 ($T_m$), fixed targets lying within the sub-range being observed are now the targets whose video is cancelled in the subtraction circuit and thus only moving target video in the sub-range being observed will be displayed on the indicator.

As can be seen, the advantages of the circuits of FIG-

URES 4 and 5 are limited. The increase in PRF which is used in the PIM is not available to increase the cancellation efficiency of the MTI system. Due to the provision of the fixed delay line, cancellation is still effected between echo returns from the fixed targets, but spaced by the major interval, not the new minor or sub-interval as determined by the provision of PIM. If the major interval of the system is equal to the MTI pulse repetition period before PIM was applied, subtracted echo return variations due to internal movement of a fixed target, or due to antenna beam pattern, will not be reduced. Hence, these circuits do not improve the cancellation of echoes from fixed targets by increasing the PRF. Although use is made of a pulse repetition period equal to the sub-interval, the MTI performance still depends on the major interval and the increase in PRF is of no benefit in the MTI cancellation process. If the full benefit of the increased PRF is to be obtained, the comparison period must be a sub-interval and each echo must be compared with the very next one received from the same target.

The mercury or any other fixed delay line is an inflexible device in that the information can be stored for only a fixed length of time ($T_D$) determined by the length of the line. The stored information is not available for use at any interval earlier than $T_D$ after the time that it is stored. Further, the information is lost unless it is used at this time, $T_D$, after storage. The storage tube, however, is a very flexible device, allowing use of the information at any time after it is stored.

Figure 6:
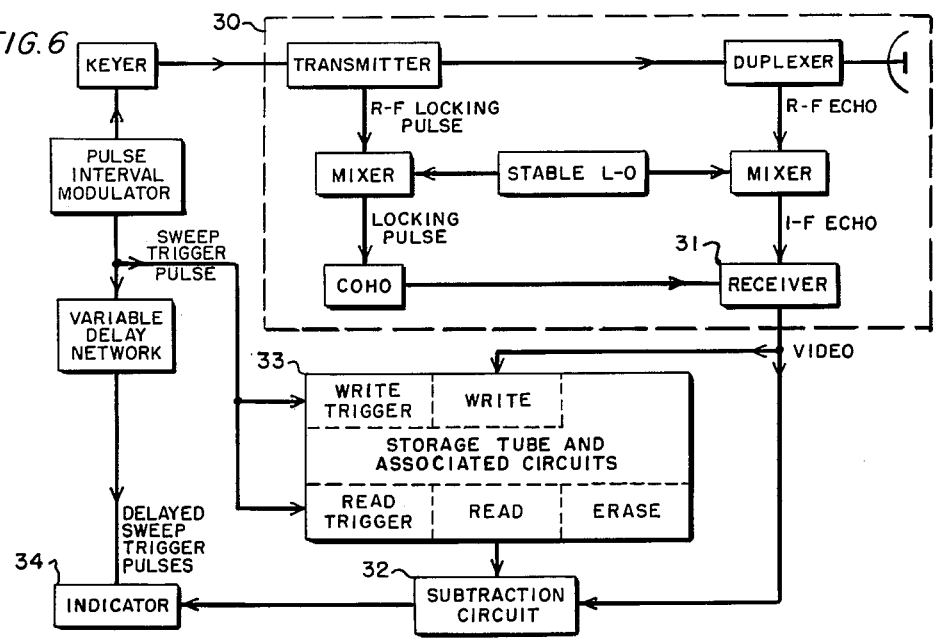
FIGURE 6 is a block diagram of a circuit incorporating PIM into a storage tube MTI system.

A block diagram of PIM applied to storage-tube MTI is shown in FIG. 6. In this figure the elements shown within the dotted lines 30 are those of a conventional MTI radar. As shown, the output video from the receiver 31 is fed directly and indirectly to the usual subtraction circuit 32. The indirect video first goes to the storage tube, where it is stored for the proper time and then released to the subtraction circuit for comparison with the signal coming through directly.

Since FIGURE 6 is a block diagram, the storage tube 33 is shown in block form since the tube per se forms no part of this invention. A suitable storage tube which could be used is known as the Graphecon and is described on pp. 50-53 of "Storage Tubes" by Knoll and Kazan, John Wiley & Sons, 1952. Another suitable tube is described on pp. 58-61. In each of these storage tubes, simultaneous writing and reading is possible.

In the system of FIGURE 6, each read-write trigger pulse triggers the storage tube sweep at the instant the transmitter pulse is transmitted. For purposes of illustration, a particular keying pulse $Pi$ may be considered. This causes a pulse to be transmitted. The pulse also triggers both the reading and writing sweeps. The writing sweep stores all video due to returning echoes in the interval $T_i$, $i+1$ (time interval between pulses $Pi$ and $P_{i+1}$).

When the next read-write pulse $P_{i+1}$ triggers the storage tube circuits, the read and write beams switch scanning lines. The reading beam now reads the signals which were stored in the interval $T_i$, $i+1$. Simultaneously the writing beam is recording video due to returning echoes in the interval $T_i+1$, $i+2$.

Immediately following the reading beam is an erasing beam or, in the case of the Graphecon, the reading beam itself accomplishes the erasing.

The reading beam causes the video recorded in the interval $T_i$, $i+1$ to be sent to the subtraction circuit for comparison with the video returning in the interval $T_i+1$, $i+2$. Since the C.W. reference I-F signal is coherent only for the first sub-interval after the pulse is transmitted, the subtraction circuit will always cancel only the fixed clutter in the first sub-range. All returning echoes beyond the first sub-range will remain uncancelled and all echoes due to moving targets in the first sub-range remain uncancelled.

The video passing from the subtraction circuit 32 to indicator 34 will be that due to all moving targets and also that due to all fixed targets beyond the first sub-range. The video finally displayed on the indicator will be only that due to fixed and moving targets in the range being surveyed, if the surveyed range is beyond the first sub-range. However, if the first sub-range is being surveyed, all ambiguities and fixed targets in the first sub-range will be absent, and only moving targets in the first sub-range will be present.

The advantages of this method over that of FIGURES 4 and 5 are that the higher PRF may now be advantageously employed, which is necessary to more effectively cancel fixed targets, since successive video pulses due to a particular target are now compared. This circuit, therefore, always eliminates the worst clutter, that in the first sub-range, by established MTI subtraction circuits. All ambiguities are discriminated against. The only disadvantage of this circuit is that the fixed clutter in the sub-range being observed is not removed, unless the first sub-range is being observed, whereupon the disadvantage is not present.

Figure 7:
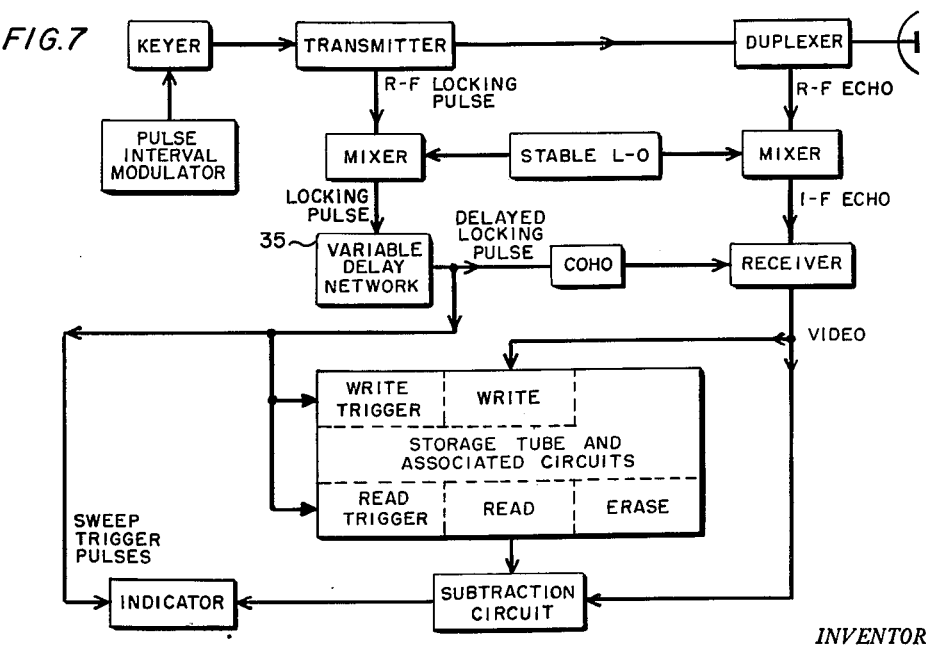
FIGURE 7 is a block diagram similar to FIGURE 6 including delayed coherency.

A system is shown in FIGURE 7 which removes all ambiguities by PIM and also removes by MTI subtraction the clutter in the sub-range being observed. The circuit of FIGURE 7 is essentially the same as that of FIGURE 6 with delayed coherency being employed due to the provision of variable delay network 35.

Each read-write trigger pulse is delayed by an interval $T_d$ which determines that portion of the range to be surveyed. In addition, by delaying the coherent I-F oscillator pulse by an amount $T_d$, the coherency of the I-F oscillator will be delayed by $T_d$. Thus, the overall receiving system is coherent only for the interval $T_d$ to $T_d+T_s$ after each transmitter pulse. Hence, all fixed targets lying in the desired range will result in constant amplitude signals leaving the receiver for comparison in the subtraction circuit.

Consider a particular keying pulse $P_i$. This causes a pulse to be transmitted. This pulse is also delayed by an interval $T_d$, and triggers the coherent I-F oscillator and the reading and writing sweeps. The writing sweep stores all the video due to returning echoes in the interval $T_d$ to $T_d+T_s$ following $P_i$. When the next read-write pulse, delayed by the interval $T_d$ from $P_{i+1}$, triggers the storage tube circuits and the coherent I-F oscillator, the read and write beams switch scanning lines. The reading beam now reads the signals which were stored in the previous sub-interval. An erasing beam follows the reading beam.

The reading beam causes the video recorded in the sub-interval following the time delay $T_d$ after $P_i$ to be sent to the subtraction circuit for comparison with the video returning in the sub-interval following that in which the delayed information was stored. Since the C.W. reference I-F signal is coherent only for the sub-interval that is delayed by $T_d$ from the transmitted pulse, the subtraction circuit will always cancel only fixed clutter in the sub-range corresponding to this sub-interval; i.e., the sub-range being observed. All returning echoes in other sub-ranges will remain uncancelled. All echoes due to moving targets in the sub-range being studied remain uncancelled.

The video passing from the subtraction circuit to the indicator will be that due to all moving targets, and that due to all fixed targets outside the sub-range being observed. The indicator discriminates against ambiguities (by the PIM system) due to fixed and moving targets outside the sub-range being surveyed.

The video finally displayed on the indicator will be only that of moving targets in the sub-range being surveyed.

Advantages of this method include direct application of higher PRF's since successive video pulses due to a particular target are now compared. The circuit eliminates all fixed clutter and ambiguities. Clutter in the sub-range being observed is eliminated by MTI subtraction. Clutter and moving targets outside this range—the ambiguities—are removed by PIM.

Obviously, many modifications and variations of the present invention are possible in the light of the above teachings. It is therefore to be understood that, within the scope of the appended claims, the invention may be practiced otherwise than as specifically described.

What is claimed is:

1. A high pulse-repetition frequency moving-target indicator system comprising a duplexer, a pulse transmitter connected to said duplexer, a first mixer connected to said transmitter, a second mixer connected to said duplexer, a local oscillator connected to and feeding into said first and second mixers, a coherent oscillator, a switch, a plurality of delay lines connected to said switch, said switch and said plurality of delay lines connected between said first mixer and said coherent oscillator, said switch operating to selectively connect only one of the delay lines between said first mixer and said coherent oscillator, a receiver connected to said second mixer and said coherent oscillator, a delay circuit and a subtraction circuit each connected from the output of said receiver, the output of said delay circuit being connected to and feeding into said subtraction circuit.

2. In a high pulse-repetition frequency moving-target indicator system, apparatus for achieving continuous coherency for a duration extending beyond the first sub-interval after each transmitter pulse, said apparatus including a mixer, a plurality of delay lines, a manually adjustable clutter sub-range switch connected between the mixer and the plurality of delay lines, and a coherent oscillator connected to the delay lines, each of said delay lines having a different fixed delay time which is a multiple of the time between successive transmitter pulses of the system, said manually adjustable clutter sub-range switch adjustable to selectively connect any desired delay line between the mixer and the coherent oscillator.

3. In a high pulse-repetition frequency moving-target indicator system, apparatus for achieving continuous coherency for a duration extending beyond the first sub-interval after each transmitter pulse, said apparatus comprising, in combination, a pulse transmitter for transmitting pulses the interval between which is less than that of the major interval of the system, a first mixer connected to said transmitter, a duplexer connected to said transmitter, a second mixer connected to said duplexer, a local oscillator connected between said first and second mixers, a receiver connected to the output of said second mixer, a coherent oscillator connected to said receiver, a plurality of delay lines connected between said first mixer and said coherent oscillator for providing fixed, progressively longer delays equal to multiples of the sub-interval of the system, means connected to said delay lines to selectively connect any of said delay lines between said first mixer and said coherent oscillator, a receiver connected to said second mixer and said coherent oscillator, a delay circuit and a subtraction circuit each connected to the output of said receiver, with the output of said delay circuit feeding into said subtraction circuit.

4. In a high pulse repetition frequency moving target indicator radar apparatus in which the interval between transmitter pulses is less than the maximum range time of the receiver, the combination comprising: a duplexer, a transmitter connected to said duplexer, a coherent oscillator, means coupling said transmitter to said oscillator for synchronizing the phase of the output of said oscillator with the output of said transmitter, receiver means connected to said oscillator and said duplexer for algebraically combining the oscillator output signal and the echo signal from said duplexer so that a signal may be obtained the amplitude of which is dependent upon the relative phase between the oscillator and echo signals, a delay circuit and a subtraction circuit each connected to the output of said receiver means, the output from said delay circuit feeding said subtraction circuit, a pulse interval modulator, keyer means connecting said modulator to said transmitter, an indicator unit having two inputs, the output of said subtraction circuit being connected to one of the indicator unit inputs, and variable delay means for coupling said modulator to the other of the indicator unit inputs.

5. In a high pulse repetition frequency moving target indicator radar apparatus in which the interval between transmitter pulses is less than the maximum range time of the receiver, the combination comprising: a duplexer, a transmitter connected to said duplexer, a variable delay network, said transmitter being coupled to said variable delay network, a coherent oscillator connected to the output of said delay network, receiver means connected to said oscillator and said duplexer for algebraically combining the oscillator output signal and the echo signal from said duplexer so that a signal may be obtained the amplitude of which is dependent upon the relative phase between the oscillator and echo signals, a delay circuit and a subtraction circuit each connected to the output of said receiver, the output from said delay circuit feeding said subtraction circuit, an indicator unit, the outputs of said subtraction circuit and said variable delay network being coupled to said indicator unit, a pulse interval modulator, and keyer means coupling said modulator to said transmitter.

6. In a high pulse repetition frequency moving target indicator radar apparatus in which the interval between transmitter pulses is less than the maximum range time of the radar, the combination of: a duplexer, a transmitter connected to said duplexer, a coherent oscillator, means coupling said transmitter to said oscillator for synchronizing the phase of the output of said oscillator with the output of said transmitter, receiver means connected to said oscillator and said duplexer for algebraically combining the oscillator output signal and the echo signal from said duplexer so that a signal may be obtained the amplitude of which is dependent upon the relative phase between the oscillator and echo signals, a pulse interval modulator, keyer means coupling said modulator to said transmitter, a subtraction circuit, a storage tube having a sweep system for writing and reading, the output of said receiver means being connected to said subtraction circuit and to said storage tube, the output of said storage tube being connected to said subtraction circuit, a variable delay network, the pulse interval modulator being coupled to said delay network and to said storage tube reading and writing sweep system, and an indicator unit, the outputs of said delay network and said subtraction circuit being connected to said indicator unit.

7. In a high pulse repetition frequency moving target indicator radar apparatus in which the interval between transmitter pulses is less than the maximum range time of the radar, the combination comprising: a duplexer, a transmitter connected to said duplexer, a variable delay network, said transmitter being connected to said variable delay network, a coherent oscillator, means for coupling the output of said variable delay network to said oscillator to lock the phase of the oscillator output to the phase of the transmitter output, receiver means connected to said oscillator and said duplexer for algebraically combining the oscillator output signal and the echo signal from said duplexer, storage means coupled to said receiver means and to said variable delay network for storing all echo signals during a given time interval after receipt of a pulse from said delay network and for transmitting to a storage output terminal the echo signals from the previous stored train of echo pulses, the transmission of said pulses to said output terminal also being initiated by receipt of a pulse from said delay network, a subtraction circuit coupled to said receiver means and to said storage output terminal, an indicator unit coupled to said subtraction circuit and to said variable delay network, a pulse interval modulator, and keyer means for coupling said modular to said transmitter.

8. In a high pulse repetition frequency moving target indicator radar apparatus in which the interval between transmitter pulses is less than the maximum range time of the radar, the combination comprising: a duplexer, a transmitter connected to said duplexer, a variable delay network, said transmitter being connected to said variable delay network, a coherent oscillator, means for coupling the output of said variable delay network to said oscillator to lock the phase of the oscillator output to the phase of the transmitter output, receiver means connected to said oscillator and said duplexer for algebraically combining the oscillator output signal and the echo signal from said duplexer, a storage tube having write and read terminals and sweep system inputs for controlling writing and reading, said variable delay network being coupled to said storage tube reading and writing sweep system inputs, a subtraction circuit coupled to said receiver means and to said storage tube read terminal, said storage tube write terminal being coupled to said receiver means, an indicator unit coupled to said subtraction circuit and to said variable delay network, a pulse interval modulator, and keyer means for coupling said modulator to said transmitter.

References Cited in the file of this patent
UNITED STATES PATENTS

| | | |
|---|---|---|
| 2,430,038 | Wertz | Nov. 4, 1947 |
| 2,437,173 | Rutherford | Mar. 2, 1948 |
| 2,646,561 | Emslie | July 21, 1953 |
| 2,746,033 | Bachmann | May 15, 1956 |